W. C. SMITH.
MUSICAL SCORE OR COMPOSITION.
APPLICATION FILED JAN. 9, 1909.
Reissued Aug. 24, 1909.
13,016.
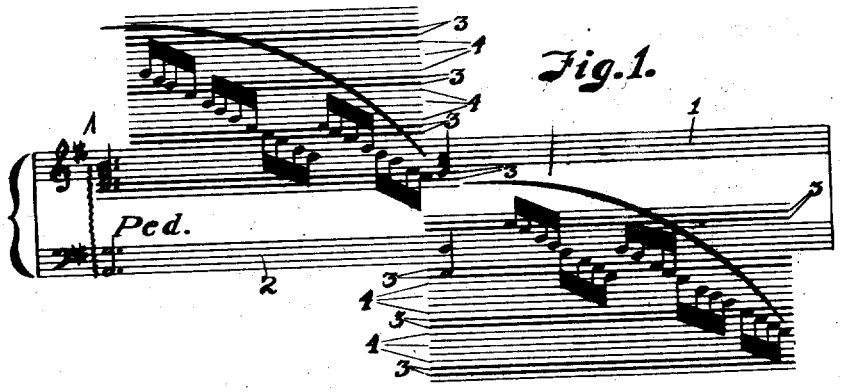
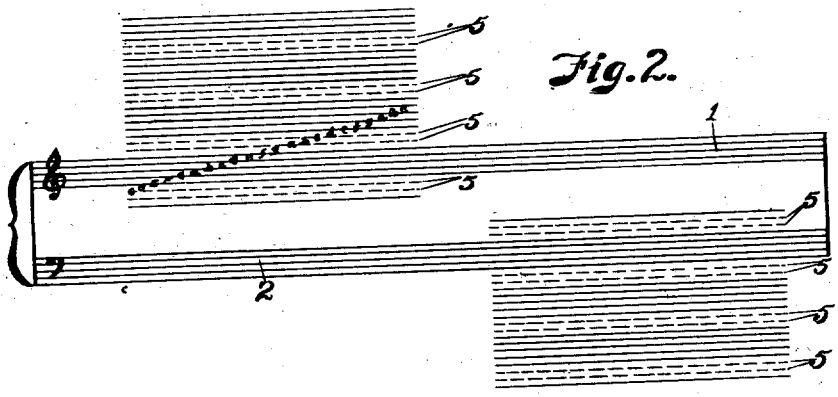
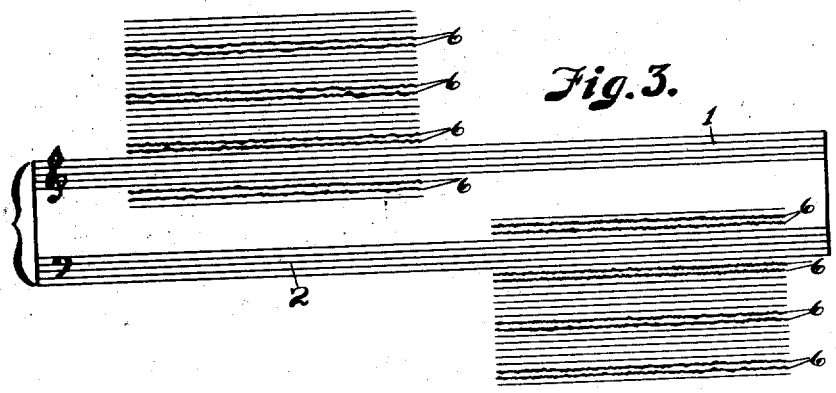
Witnesses.
M. M. Boyle
E. H. McDonell
Inventor:
Willard C. Smith
By Rudolph M. Ritter
Attorney.

UNITED STATES PATENT OFFICE.

WILLARD C. SMITH, OF CHICAGO, ILLINOIS.

MUSICAL SCORE OR COMPOSITION.

13,016. Specification of Reissued Letters Patent. Reissued Aug. 24, 1909.

Original No. 885,192, dated April 21, 1908, Serial No. 284,722. Application for reissue filed January 9, 1909. Serial No. 471,540.

*To all whom it may concern:*

Be it known that I, WILLARD C. SMITH, a citizen of the United States, residing at Chicago, in the county of Cook and State of Illinois, have invented certain new and useful Improvements in a Musical Score or Composition; and I hereby declare the following to be a full, clear, and exact description, such as will enable others skilled in the art to which it appertains to make and use the same.

This invention relates to a musical score or composition, being especially directed to the arrangement of distinguishing leger lines and repetitions of the original staff both above and below the latter as occasion may require, and in connection with either or both the treble and the bass staffs.

The object of my invention is to provide means whereby a musical score or composition is rendered more easily and quickly legible at such points therein as notes representing tone elevation or tone pitch, higher or lower than can be represented within the original staff of five lines appear, whereby strain on the eyes and errors and delay on the part of the performer due thereto are greatly reduced or entirely obviated.

The invention consists in placing above and below the original staff of five lines, either treble or bass, repetitions of the said original staff and between such added and original staffs placing what I term "distinguishing leger lines" which are spaced similarly to the staff lines, the said leger lines being added at such points in a musical score where a note or a group of notes appear representing tone elevations or pitch higher or lower than can be represented in the original staff.

The invention consists further in the specific arrangement of said repetitions of the staff lines and the said distinguishing lines relatively to each other and to the original staff.

In the drawing, Figure —1— shows treble and bass staffs with the distinguishing leger lines applied above and below the same and in alternation with the groups of staff like leger lines. Fig. —2— is a view similar to Fig. —1—, showing a slight modification in the distinguishing leger lines. Fig. —3— is a view similar to Figs. —1— and —2— showing a still further modification in the distinguishing leger lines.

The sole purpose of this invention is to render legible with ease such notes as appear outside the original staff, either treble or bass.

Where notes representing tones of higher or lower pitch than can be properly represented in the original staff are used in a musical score or composition, they are usually intersected by short lines spaced similarly to the staff lines and parallel therewith. Such lines are relatively difficult to discern and cause confusion of the performer as well as a strain on the eyes.

My invention comprehends the use of sets of lines of sufficient length to be readily discernible and distinguished from each other which are relatively so placed as to enable the performer to easily locate on the key board or finger board of an instrument any note or notes appearing on such lines.

At any desired point or points in a musical staff of five lines or a pair thereof comprising the treble staff 1 and the bass staff 2, I add distinguishing leger lines 3 above or below the same or at both said points. The said leger lines 3 are distinguished from the staff lines in any suitable manner, as, for example, by making the same heavier as shown in Fig. 1, or of a different color, or by breaking the same at intervals as shown in Fig. 2 in which dotted lines 5 are illustrated, or rendering them wavy as shown at 6 in Fig. 3.

The treble staff is capable of carrying notes on the lines thereof and in the spaces between the lines ranging consecutively from "e" on the lowest line to "f" on the uppermost line, *i. e.* said notes read consecutively as follows; "e—f—g—a—b—c—d—e—f" a total of nine notes. The scale begins ordinarily with "c" two steps below said staff, and would appear on the first leger line 3 below said staff. The note "c" two octaves higher would appear on the second leger line 3 above the staff 1. Where notes higher than the last named "c" appear in the score a set 4 of five lines constituting a repetition of the original staff are added above the leger lines 3 and similarly spaced, said last named set 4 of staff lines being thus so disposed that any note appearing on any line therein or in any space between lines therein will be exactly two octaves removed from a note similarly disposed in the staff 1.

If notes higher than can be represented in the said added set 4 of staff lines appears in the score, another pair of said leger lines 3 is added above said set 4 of staff lines and thereabove (if the tone elevation of the note requires) another set 4 of said staff lines is added, such additions being repeated as often as required to place a note on an added line the requisite number of spaces above the staff 1 to enable the performer to properly locate the same on the key board or finger board of the instrument.

The same relative dispositions of distinguishing leger lines 3 and staff lines 4 applies to the bass staff 2 except that in the latter the said added staff lines would appear below instead of above the staff 2.

It will be understood that the length of the said added leger lines 3 and staff lines 4 would be varied according to the number and relative dispositions of notes in the score ranging higher or lower than those in the staffs 1 and 2, and would appear only at such places in the score where the notes of the composition require their disposition above or below the staffs 1 and 2 respectively. That is to say, that in setting up the score, the publisher or compositor adds the leger lines 3 and staff lines 4 only at such places and of such lengths as are requisite to definitely locate notes appearing outside the original staffs 1 and 2.

It will thus be seen that my invention not only comprehends the use of added leger and staff lines but includes more particularly the specific arrangement of the distinguishing leger lines and added staff lines whereby notes appearing on the latter may be definitely located on the key or finger board exactly two octaves higher or lower than the same note in the treble or bass staffs respectively, this being true also of notes disposed on the leger lines with respect to disposition of the latter above or below the respective staffs or added staff lines.

By means of my invention strain on the eyes and confusion of the performer are practically entirely obviated or reduced to a minimum.

My invention may also be applied to vocal music but owing to the limited range of the latter its application thereto is not as important as with relation to instrumental music.

The added leger and staff lines do not affect in any manner the signs or emblems used on scores to indicate key, time, rests, repetitions, etc.

I claim as my invention:

1. The combination with an ordinary musical staff of five lines, of leger lines located outside of the said ordinary staff lines and having distinguishing characteristics, and other leger lines similar to the staff lines disposed between the said distinguishing leger lines, the leger lines having distinguishing characteristics being spaced to represent certain tone elevations.

2. The combination with the ordinary musical staff of five lines, of differentiating leger lines arranged above and below the staff and similarly spaced to represent tone elevations or tone pitch and sets of leger lines similar to the staff alternating with the said differentiating leger lines.

3. The combination with a musical staff of five lines, of pairs of leger lines disposed outside of the said musical staff of five lines and having distinguishing characteristics, and other leger lines arranged between the said pairs of leger lines and similar to the staff lines, the pairs of leger lines being spaced to designate tone elevations.

4. The combination with an ordinary musical staff of five relatively light lines, of relatively heavy leger lines located outside of the ordinary staff lines, the two sets of lines being indicated by the letters of the gamut, and other relatively heavy leger lines disposed between the ordinary leger lines and having letters of the gamut, the leger lines bearing the letters of the gamut being spaced to represent certain tone elevations.

In testimony whereof I have signed my name in the presence of two subscribing witnesses.

Chicago, Ill., January 6, 1909.

WILLARD C. SMITH.

Witnesses:

RUDOLPH WM. LOTZ,
M. M. BOYLE.